April 16, 1935.  L. D. SOUBIER  1,998,336
GLASS BLOWING MACHINE
Filed Nov. 1, 1930   4 Sheets-Sheet 1
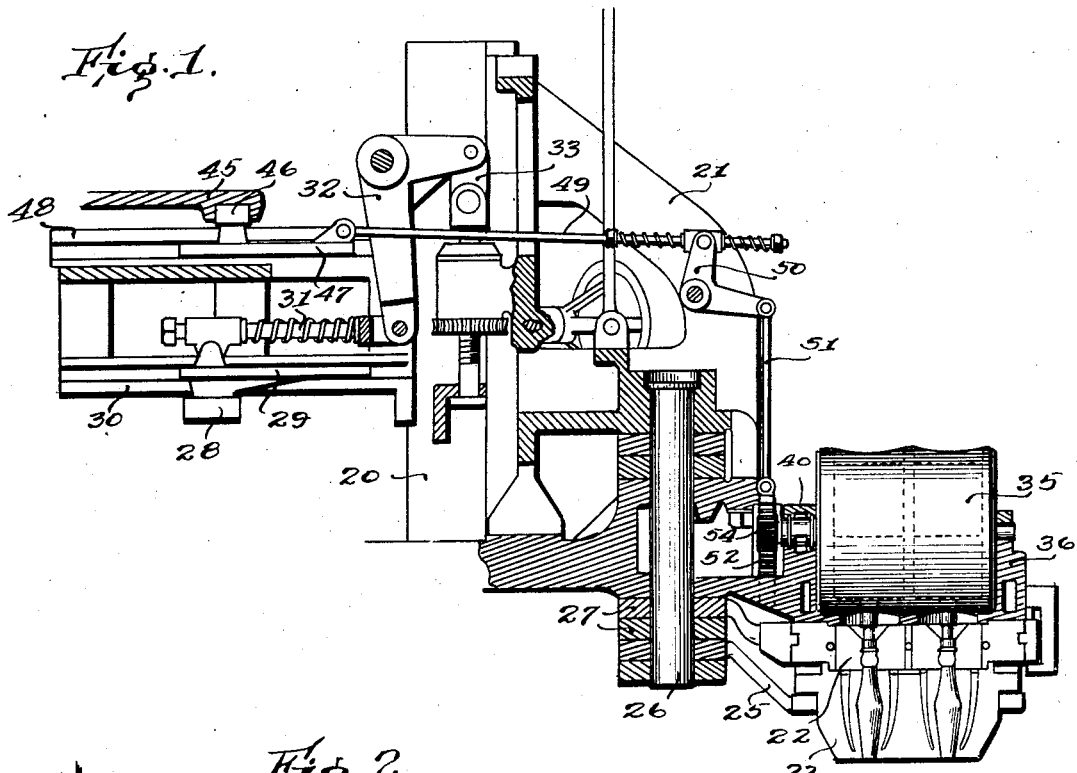
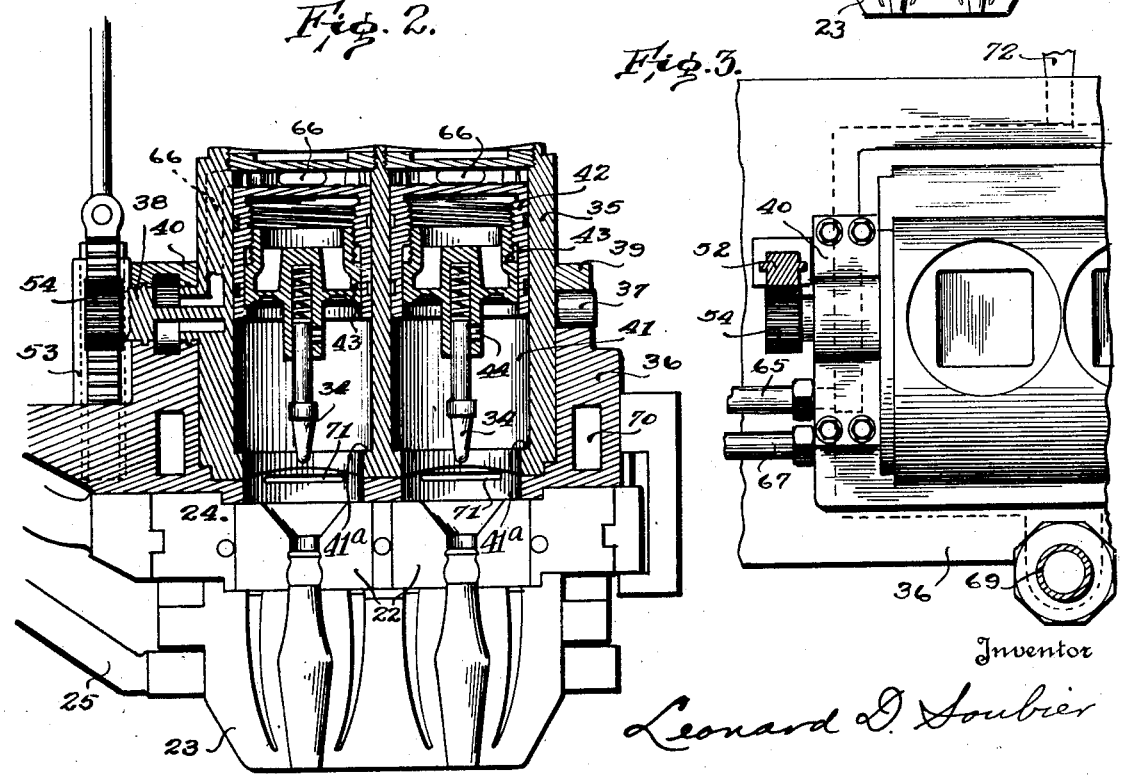
Inventor
Leonard D. Soubier
By J. F. Rule
Attorney

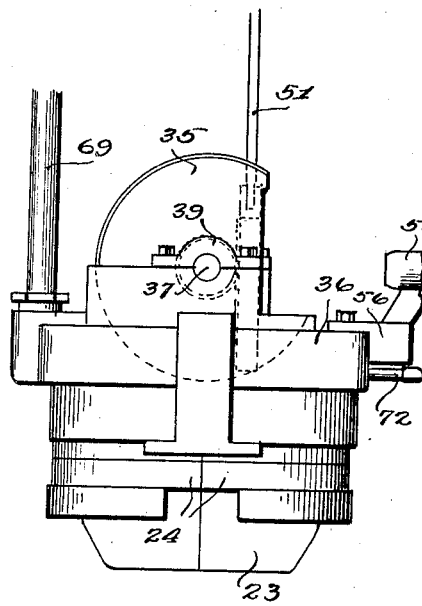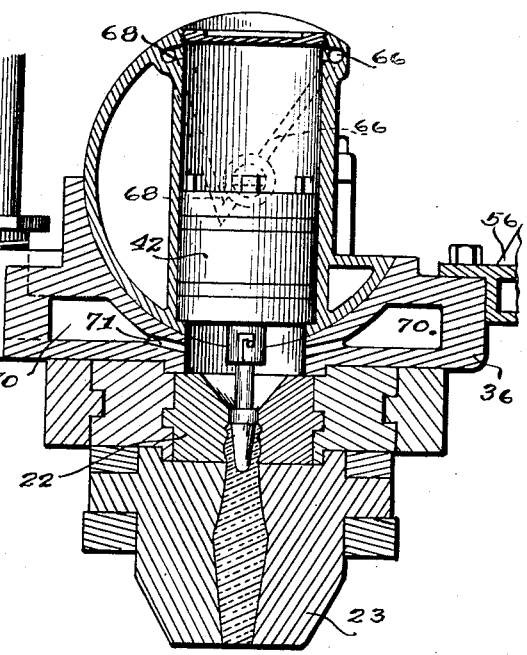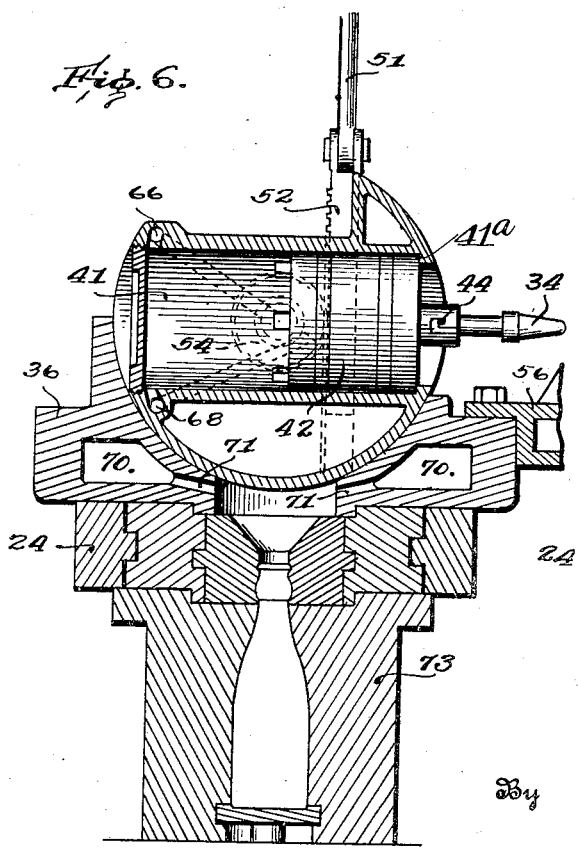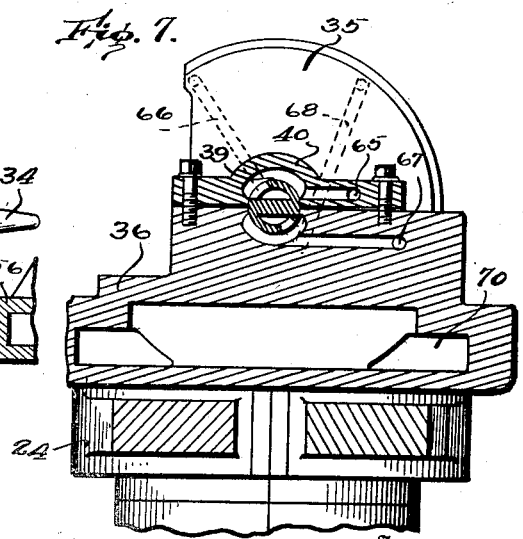

April 16, 1935.  L. D. SOUBIER  1,998,336
GLASS BLOWING MACHINE
Filed Nov. 1, 1930  4 Sheets-Sheet 3

Inventor
Leonard D. Soubier
By J. F. Rule
Attorney

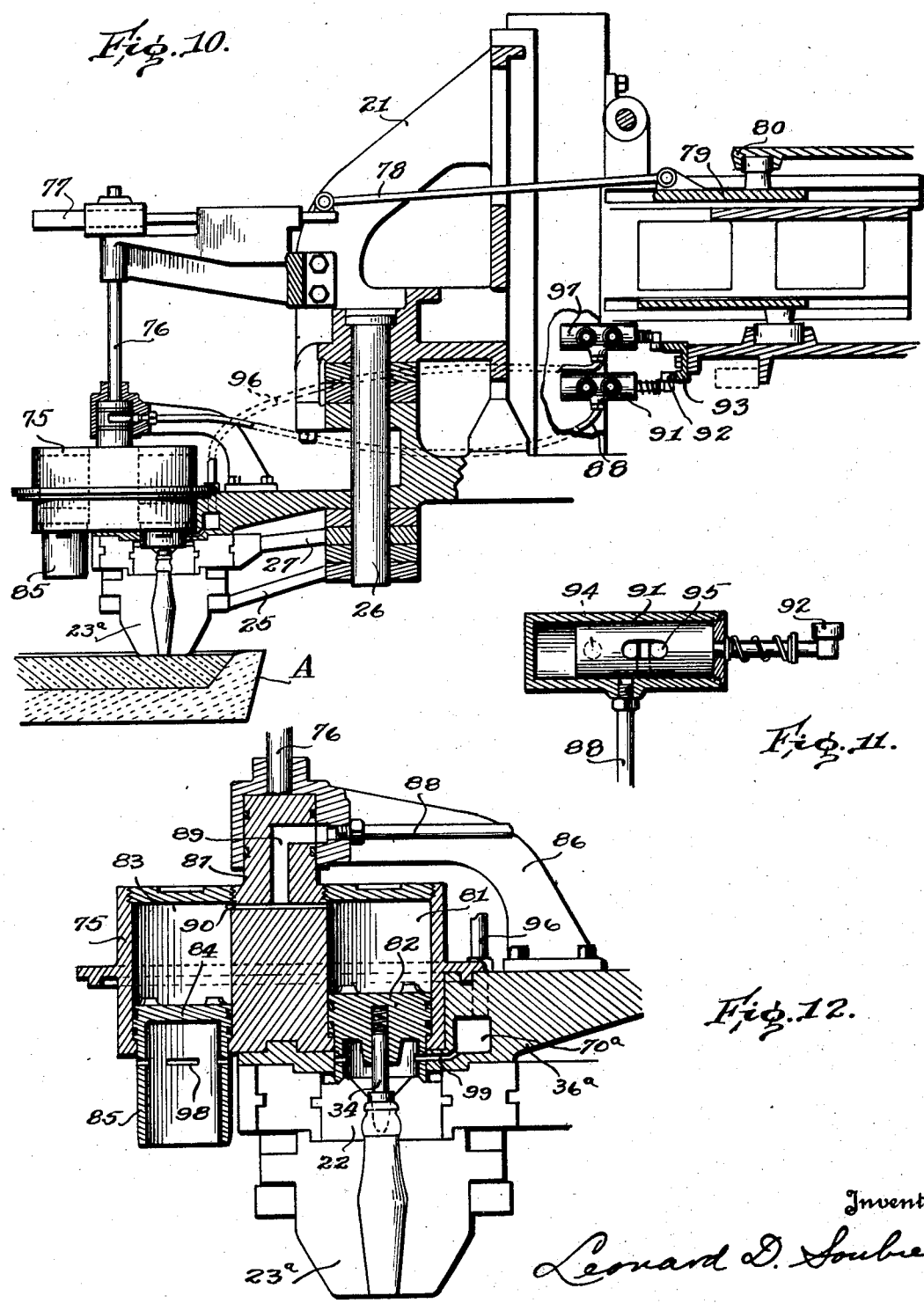

Patented Apr. 16, 1935

1,998,336

UNITED STATES PATENT OFFICE 1,998,336

GLASS BLOWING MACHINE

Leonard D. Soubier, Alton, Ill., assignor to Owens-Illinois Glass Company, a corporation of Ohio Application November 1, 1930, Serial No. 492,710

16 Claims. (Cl. 49—5)

My invention relates to machines for making hollow glass articles such as bottles and jars. The invention is herein illustrated as embodied in a suction gathering type of machine in which the charges of glass are drawn by suction into combined blank and neck molds, and the parisons formed in such molds transferred to finishing molds in which they are blown to their final form.

An object of the invention is to provide a more simple and practical mechanism than that in general use at the present day on machines of this type, for carrying and actuating the plungers and for controlling the application of air and vacuum to the molds.

Another feature of the invention consists of providing mechanism of the character indicated which is compact, efficient in operation, and in which the parts are easily accessible for removing or adjustment.

A further object of the invention is to provide a simple and practical mechanism for cooling the plungers.

Other objects of the invention will appear hereinafter.

In the accompanying drawings:

Fig. 1 is a part sectional side elevation showing part of a machine constructed in accordance with my invention.

Fig. 2 is a sectional elevation on a larger scale showing a pair of parison molds, plungers and their actuating mechanism.

Fig. 3 is a fragmentary top plan view of parts shown in Fig. 2.

Fig. 4 is a front elevation showing a parison mold and blowing head.

Fig. 5 is a sectional view on a larger scale of mechanism shown in Fig. 4.

Fig. 6 is a sectional view similar to Fig. 5, showing the plunger in its inoperative position and a finishing mold which replaces the blank mold.

Fig. 7 is a sectional view of the blowing head and associated parts.

Fig. 10 is a sectional elevation showing a modified form of my invention.

Fig. 11 is a detail view of a valve.

Fig. 12 is a sectional elevation of the parison mold and blowing head shown in Fig. 10.

Figure 8:
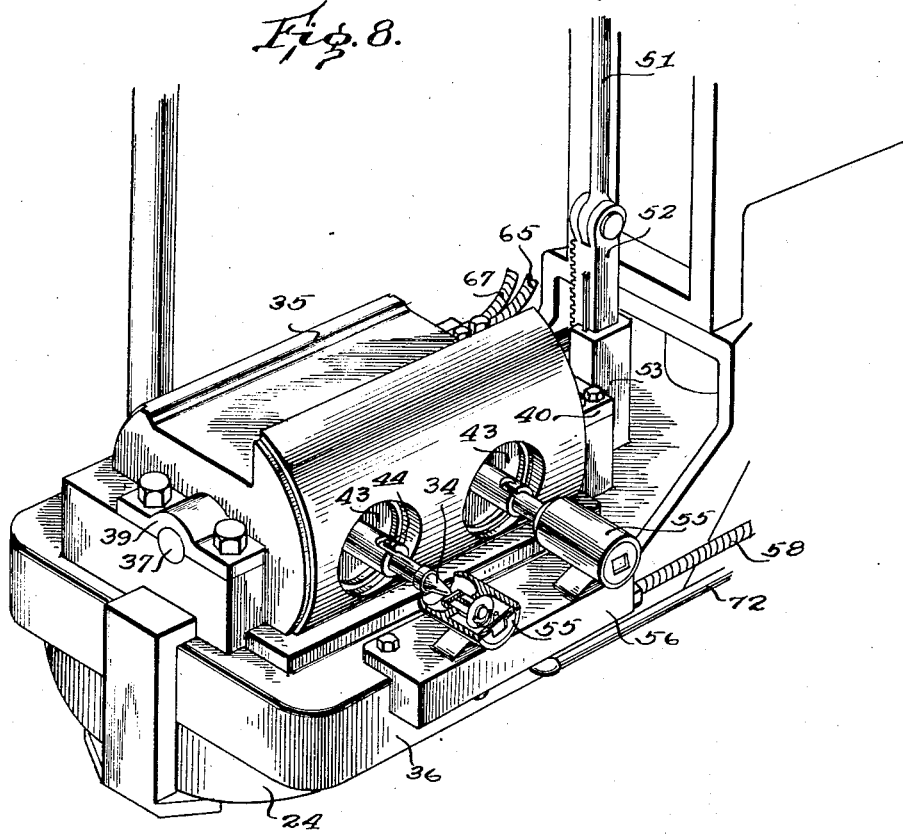
Fig. 8 is a perspective view showing the plunger carrying drum and associated parts.

Referring to Fig. 1, the machine comprises a mold carriage 20 which may be rotated continuously about a vertical axis, and on which are mounted a series of units each including a dip frame 21 movable up and down on the mold carriage. On each dip frame is mounted a neck mold or molds 22 and blank molds 23 which together form the parison molds into which the charges of glass are introduced by suction in the usual way and in which the parisons are formed. In the form of invention shown in Figs. 1 to 9, double molds are employed. That is, two blank mold cavities are formed in each mold block or section 23 and a corresponding pair of neck rings or molds 22 are mounted in a carrier 24. The molds are made in horizontally separable sections. The blank molds are carried on arms 25 mounted to swing on a vertical pivot pin 26 for opening and closing the molds, said pin being supported on the dip frame 21. The neck rings are carried on arms 27 also mounted on the pivot pin 26. Mechanism for lifting and lowering the dip frame includes a cam roll 28 running in a stationary cam (not shown), said roll carried by a slide plate 29 adapted to reciprocate radially of the mold carriage in guides 30 on the carriage. The slide plate has an operating connection with the dip frame, through a link 31, bell crank 32 and link 33.

Plungers 34 are adapted to be projected into the neck molds and serve the usual function of forming initial blow openings in the parisons and also cooperate with the neck molds to form neck portions of the articles. The plungers are supported in a drum or carrier 35. The drum is rotatable about a horizontal axis, being mounted on a combined suction and blowing head 36 which forms an extension of the dip frame 21. The drum is formed with trunnions 37 and 38 which seat in the bearings formed on the head 36. Removable bearing plates 39 and 40 are fitted over the trunnions 37 and 38 respectively.

The drum 35 carries a pair of piston motors including cylinders 41 formed in the drum, and pistons 42 adapted to reciprocate in said cylinders, the walls of which are formed with stops 41ª serving to limit the plunger projecting movement of the pistons. The pistons are reciprocated in a direction perpendicular with the axis of the drum, said axis intersecting the axes of the pistons. Each piston 42 is made hollow and internally threaded to receive a threaded head 43 which carries a plunger 34. By rotating either head 43, the corresponding plunger may be adjusted relative to the piston in a direction lengthwise thereof. Each plunger 34 has a bayonet slot and pin connection 44 with its head 43 permitting the plunger to be readily attached to or removed from its supporting head.

The drum 35 is oscillated by mechanism including a stationary cam 45 (Fig. 1) on which runs a roll 46 carried by a slide 47 which reciprocates in guides 48 on the mold carriage. The slide is connected through a rod 49 with one arm of a bell crank 50 pivoted on the dip frame 21. The other arm of the bell crank is connected through a link 51 with a rack bar 52 mounted to reciprocate vertically in a guide 53 on the head 36. The rack meshes with a pinion 54 keyed to the trunnion 38. The cam 45 operates through the connections just described, to oscillate the drum 35 through an arc of substantially 90 degrees and thereby rotates the plungers 34 from a vertical position in which they are in line with the molds, to a horizontal position as shown, for example, in Figs. 6, 8 and 9.

When the plungers are in their vertical position, the pistons 42 are moved downward to project the plungers into the neck mold as shown in Fig. 5 and remain in such position during the gathering of the glass as hereinafter pointed out, and are then retracted to the Fig. 2 position, after which the carrying drum 35 is oscillated to bring the plungers to the horizontal position. The plungers may then be projected as shown in Figs. 6, 8 and 9, permitting them to be quickly cooled.

Figure 9:
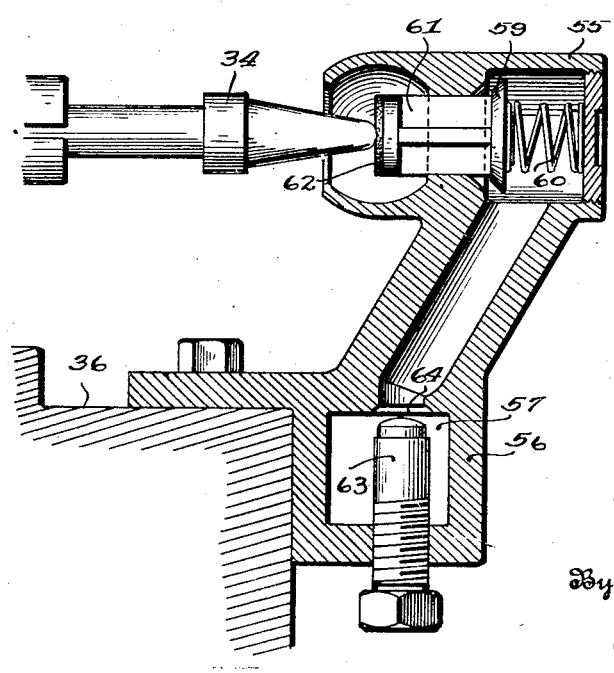
Fig. 9 is a sectional view on an enlarged scale, showing mechanism for air cooling the plunger.

Means for cooling the plungers, as shown in Figs. 8 and 9, comprise blowers including air cylinders 55 mounted on or formed integral with a hollow bracket arm 56 removably attached to the head 36. The arm 56 is formed with a chamber or passageway 57 connected through a pipe 58 (Fig. 8) with a constant source of air pressure. A valve 59 mounted in the cylinder 55 is held against its seat by a spring 60. The valve is formed with an extension 61 in the path of the plunger 34 so that when the latter has been swung up to its horizontal position and is projected outwardly, it engages the extension 61 and opens the valve. This permits cooling air to flow through the channel 57 and past the valve. Incidentally, this unit may also assist the stop 41a in limiting the projection of the plungers. The moving air which surrounds the plunger quickly cools it to the desired temperature. A layer 62 of asbestos or the like, is attached to the valve extension 61 to cushion and protect the plunger tip. The rate of flow of air for cooling the plunger is adjustably regulated and controlled by a throttle valve 63 threaded into the arm 56 and adjustable to vary the size of a port opening 64 and thereby throttle the flow of air to any desired extent.

The pistons 42 for actuating the plungers are moved up and down in their cylinders by the alternate application of air pressure and suction above the pistons. The air pressure is supplied through a pipe 65 (Fig. 3) which extends to the head 36. The air line 66 continues from the pipe 65 to the trunnion 38 (Fig. 2) and through the wall of the drum 35 to the upper ends of the cylinders 41. Suction is applied through a pipe 67 (Fig. 3), the suction line 68 continuing from said pipe through the head 36 and drum 35 to the upper end of the cylinders 41. The supply of air and vacuum to the pipes 65 and 67 is controlled by valves (not shown) on the machine.

The charges of glass are drawn into the parison molds in the usual manner by suction applied through a pipe 69 (Fig. 5) which opens into a chamber 70 in the head 36. Channels 71 provide communication from the chamber 70 to the open upper end of the neck mold. Air under pressure for blowing the parison in the blank and finishing molds is supplied through a pipe 72 which opens into the chamber 70. The supply of air and vacuum through the pipes 72 and 69 respectively is controlled as usual by valves (not shown) on the machine.

The operation of the mechanism shown in Figs. 1 to 9 is as follows:

The mold carriage 20 is rotated continuously and brings the parison molds in succession over a tank A (Fig. 10) containing a supply body of molten glass. When the mold 23 is over the glass, the dip frame 21 is lowered to bring the mold into contact with the glass. Fig. 2 shows the relative position of the parts shortly before the molds contact with the glass. A slight bleeding of air under pressure to the line 66 causes a slow downward movement of the pistons 42 as the molds approach the gathering position. At the moment the molds touch the glass or an instant before, the chambers 70 are opened to the vacuum, thus causing a quick exhaustion of air from the mold cavities and at the same time causing the pistons 42 and plungers 34 to move rapidly downward so that the plungers assume their operative position within the neck molds. At the same time that the vacuum line is opened to the molds, the line 66 may be opened to high pressure to assist in causing a quick downward movement of the plungers and also to assure the seating of the plungers within the neck molds. The exhaustion of air from the mold cavities as above described, causes an upward movement of glass into the molds simultaneously with the downward movement of the plungers. The downward movement of the plungers, however, is completed in time to prevent the glass from being drawn upward beyond the mold cavity. After the charges of glass have been drawn into the molds, the dip frame 21 is lifted and a knife (not shown) operates to sever the glass at the bottom of the blank mold. Suction is then applied through the pipe 67 and channel 68 to the upper ends of the cylinders 41 so that the pistons 42 are drawn upward, thereby withdrawing the plungers into the cylinders. After the plungers are withdrawn, the cam 45 operates through the connections shown to rotate the drum 35 through an angle of substantially 90 degrees to the Fig. 6 position. In this position a part of the drum serves to seal the plunger openings. Air pressure is now supplied through the pipe 65 (Fig. 3) and air line 66 and projects the plungers, as shown in Figs. 6 and 9. The plungers when projected, open the valves 59 (Fig. 9) so that a blast of cooling air envelopes the plunger.

After the plungers have been withdrawn from the neck molds, the usual puff of air may be applied, if desired, through the pipe 72 for compacting the glass in the blank mold. After the blank is sufficiently cooled, the blank mold is opened and a finishing mold 73 (Fig. 6) closes around the parisons which at this time are suspended from the neck molds. The parisons are then blown to finished form by air pressure supplied through the pipe 72. The neck and finishing molds may then be opened for discharging the finished articles. The blank and neck molds are again closed, the plungers withdrawn and the drum 35 rotated to bring the plungers to vertical position and the latter are again projected into the neck molds, the parts being now ready for another glass gathering operation.

Figs. 10 to 12 illustrate a modification in which a single cavity blank mold 23ª is provided on each dip frame 21. A drum 75 is mounted on the head 36ª for oscillation about a vertical axis. A stem or shaft 76 rising from the drum is actuated for rotating the drum by means of a rack bar 77 engaging a pinion on said shaft, said rack bar connected through a rod 78 to a slide 79 which is reciprocated radially of the mold carriage by means of a cam 80. The drum 75 is formed with a cylinder 81 in which a piston 82 reciprocates vertically, said piston carrying a plunger 34. The drum is also provided with a cylinder 83 in which a piston 84 reciprocates, said piston including an integral cylinder or sleeve extension 85 which forms a blowing head. A bracket arm 86 on the dip frame provides a bearing for a cylindrical head or extension 87 on the drum 75. A pipe 88 connected to the bracket 86 opens into a channel 89 extending through the head 87 to a transverse channel 90 leading to the cylinders 81 and 83. Air pressure and suction are alternately applied through the pipe 88 to the cylinders for lowering and lifting the pistons 82 and 84. The supply of air and vacuum through the pipe 88 is controlled by a valve 91 (Figs. 10 and 11). The valve stem carries a cam roll 92 which engages a stationary cam 93 on the machine for actuating the valve. Reciprocation of the valve opens the pipe 88 alternately to an air pressure pipe 94 and vacuum pipe 95.

Suction for drawing the glass into the mold and air pressure for blowing the parison, are supplied through a pipe 96 which leads from the chamber 70ª to a valve 97 which may be substantially like the valve 91 in construction and operation.

The operation of the mechanism shown in Figs. 10 to 12 is as follows:

As the mold carriage rotates, the parison mold is brought over the gathering pot A and the dip frame 21 is then lowered to contact the mold with the glass in the pot. The valve 97 is actuated to connect the pipe 96 with a source of vacuum and thereby exhaust the air from the mold so that a charge of glass is drawn into the mold. The mold is then lifted and the glass severed. The valve 91 is also operated to open the pipe 88 to suction so that the air is exhausted from the cylinders 81 and 83 and the pistons 82 and 84 are moved upward within their cylinders. The valve 97 may now be reversed to cut off the vacuum and apply air pressure for compacting the glass in the blank and neck molds, the valve being then moved to neutral position. The blank mold is now opened and the finishing mold closed around the suspended parison. The drum 81 is also given a half revolution about its vertical axis by means of the cam 80. This brings the blowing cylinder 85 over the blow mold, the positions of the motor cylinders 81 and 83 being reversed. After the finishing mold closes around the parison, the neck mold is opened. The opening of the neck mold may take place either before, during or after the said rotation of the drum 75. After the drum has completed its movement so that the blowing cylinder 85 is over and in line with the finishing mold, the valve 91 is actuated by its cam to supply air pressure through the pipe 88 and lower the pistons 82, 84 so that the blowing cylinder 85 seats on the finishing mold, enclosing the neck end of the parison which protrudes above the finishing mold. The interior of the blowing cylinder is now in communication with the chamber 70ª through a port 98 in the cylinder wall which registers with a passageway 99 leading to said chamber. The valve 97 is now positioned to supply air under pressure to the blowing cylinder so that the glass is blown to its finished form. After the air pressure has been maintained the desired length of time, the valve 91 is reversed, so that the motor pistons are drawn upward by suction and the drum 75 is then rotated to reverse the piston motors preparatory to gathering a succeeding charge of glass. The finishing mold is opened and the blown article discharged in the usual manner.

Modifications other than those herein disclosed may be resorted to within the spirit and scope of my invention.

What I claim is:

1. In a machine for forming glass articles, the combination of a mold carriage rotatable about a vertical axis, a dip frame thereon, means for moving said frame up and down on the carriage, molding means on said frame providing a plurality of mold cavities arranged with their axes vertical, a carrier mounted on the dip frame above said molding means, plungers mounted in said carrier, means for projecting the plungers into and withdrawing them from the mold cavities, and means for oscillating the carrier on the dip frame, the mold cavities being arranged with their said axes in the same vertical plane radial to the mold carriage, the axis on which the carrier oscillates being horizontal and extending radially of the mold carriage.

2. The combination of a mold, a plunger, means for projecting the plunger into the mold, a blower, a valve controlling the supply of air through the blower, and means actuated by the plunger for opening said valve and directing a flow of unconfined cooling air against the plunger.

3. The combination with a mold, a plunger movable into and out of the mold, a blower, a valve in the blower, and means for projecting the plunger into the blower and causing it to open the valve.

4. In a machine for forming glass articles, the combination of a mold, a plunger, a carrier in which the plunger is mounted, means for reciprocating the plunger in said carrier, a blowing head mounted in said carrier, means for reciprocating the blowing head in the carrier, and means for rotating the carrier about an axis located between said plunger and blowing head.

5. In a machine for forming glass articles, the combination of a mold carriage, a mold thereon having a vertical mold cavity, a carrier mounted on the mold carriage above the mold, a plunger in said carrier, means for reciprocating the plunger vertically in the carrier into and out of a position to project into the mold, a blowing head mounted in said carrier, means to move said head up and down in the carrier, and means to rotate the carrier about a vertical axis between said plunger and blowing head.

6. A machine for forming hollow glass articles comprising a mold carriage, a mold thereon having a vertically disposed mold cavity, a combined suction and blowing head on the carriage and positioned over the mold, a drum supported on said head, an air motor within said drum comprising a vertically reciprocating piston, a plunger carried by said piston and moved by the piston into and out of position to project into the mold, means for applying air pressure and suction in alternation through said head to the mold, means for oscillating said drum while the piston and plunger are in retracted position and thereby carrying the plunger toward and from its position over and in line with the mold, and means for projecting the piston and plunger to expose the plunger for cooling when it has been carried by the drum away from said position in line with the mold.

7. The combination of a mold, a plunger, means for projecting the plunger into the mold, means for moving the plunger to an inoperative position, means for blowing a parison of glass in the mold while the plunger is in said inoperative position, and mechanism operating independently of said blowing means and controlled by the plunger for applying cooling air to the plunger while in said inoperative position.

8. A machine for forming hollow glass articles comprising, in combination, a mold, a vertical shaft offset laterally with respect to the mold, a blowing head carried by the shaft at one side thereof, a plunger carried by the shaft at the opposite side thereof, means for periodically rotating the shaft and thereby alternately positioning the blowing head and said plunger in operative relation to the mold, and means for projecting the plunger into the mold cavity.

9. In a machine for forming glass articles, the combination of a suction gathering blank mold open at its lower end to receive a charge of glass, a neck mold above and in register with the blank mold, a vertical shaft offset laterally with respect to the mold, a blowing head supported on the shaft at one side thereof, a plunger supported on the shaft at the opposite side thereof, means for periodically rotating the shaft and thereby alternately positioning the blowing head and plunger over the neck mold, means for projecting the plunger into and withdrawing it from the neck mold, and means for supplying air under pressure through the blowing head to said molds while the blowing head is positioned over the neck mold.

10. The combination of a mold, a plunger, a blowing head, a carrier on which the plunger and blowing head are mounted, means for reciprocating the plunger and blowing head in the carrier and thereby projecting them into and withdrawing them from position to cooperate with the mold, and means for rotating the carrier about an axis parallel with and at one side of the plunger axis and thereby moving the plunger and blowing head alternately to a position in line with the mold.

11. A machine for forming glass articles comprising, in combination, a mold carriage rotatable about a vertical axis, a mold thereon with its axis vertical, a vertical plunger in line with the mold, means for projecting the plunger lengthwise into the mold, means for forming a parison in the mold while the plunger is in said projected position, means for withdrawing the plunger from the parison and mold, and means operable after the plunger is withdrawn for swinging the plunger about a horizontal axis which intersects said axis of the mold and is radial to the mold carriage, the mold and parison being non-rotatable about said horizontal axis.

12. In combination, a combined suction and blowing head, a blank mold suspended therefrom, a plunger unit including a drum mounted upon the head for oscillation about a horizontal axis intersecting the longitudinal axis of the blank mold, a plunger, a motor carried by the drum, a holder separably connecting the plunger and motor, means for operating the motor to thereby alternately project and retract the plunger, means constituting a part of the drum and operable after retraction of the plungers from the mold for closing off the interior of the drum from the mold, and means for oscillating the drum.

13. In combination, a combined suction and blowing head having a vertical passageway therethrough, a blank mold suspended from said head in register with the opening, a plunger unit including a drum mounted upon the head for oscillation about a horizontal axis intersecting the axis of said mold cavity, a plunger operating motor carried by the drum, a plunger separably connected thereto, means for oscillating the drum to thereby alternately place the plunger in alignment with the mold cavity and in cooling position, means for operating the motor to thereby alternately project and retract the plunger, and means constituting a part of the drum and brought by movement of the plunger to the cooling position into position to seal the upper end of said passageway.

14. In combination, a combined suction and blowing head, a blank mold suspended therefrom, a plunger unit including a drum mounted upon the head for oscillation about a horizontal axis intersecting the longitudinal axis of the blank mold, a fluid operated piston motor carried by said drum, a plunger connected to the motor, means for operating said motor to thereby alternately project and retract the plunger relative to the drum, means for oscillating the drum, and means adapted for engagement with the plunger motor to limit the extent of projection of the plunger.

15. In combination, a blank mold, a combined suction and blowing head having a vertical passageway therethrough in register with the blank mold cavity, a plunger adapted to be projected through said passageway into the mold cavity, a fluid operated motor for projecting and retracting the plunger, a drum carrying said motor and plunger, means for oscillating the drum to thereby alternately place the plunger in register with the mold and in a horizontal position, and means constituting a part of the drum for sealing the upper end of said passageway while the plunger occupies its horizontal position.

16. In combination, a blank mold, a combined suction and blowing head having a vertical passageway therethrough in register with the blank mold cavity, a plunger adapted to be projected through said passageway into the mold cavity, a fluid operated motor for projecting and retracting the plunger, a drum carrying said motor and plunger, means for oscillating the drum to thereby alternately place the plunger in register with the mold and in a horizontal position, means constituting a part of the drum for sealing the upper end of said passageway while the plunger occupies its horizontal position, and a bracket carried by said head and operating in part to limit the extent of projection of the plunger under influence of the motor while in a horizontal position.

LEONARD D. SOUBIER.